United States Patent
Qiao et al.

(10) Patent No.: US 12,115,520 B2
(45) Date of Patent: Oct. 15, 2024

(54) ZONED CATALYSTS FOR CNG ENGINE EXHAUST GAS TREATMENTS WITH IMPROVED AMMONIA EMISSION CONTROL

(71) Applicant: Jonhson Matthey (Shanghai) Chemicals Limited, Shanghai (CN)

(72) Inventors: Dongsheng Qiao, Shanghai (CN); Jingwen Wang, Shanghai (CN); Xiang Zheng, Shanghai (CN)

(73) Assignee: JOHNSON MATTHEY (SHANGHAI) CHEMICALS LIMITED, Shanghai (CN)

( * ) Notice: Subject to any disclaimer, the term of this patent is extended or adjusted under 35 U.S.C. 154(b) by 66 days.

(21) Appl. No.: 17/936,090

(22) Filed: Sep. 28, 2022

(65) Prior Publication Data
US 2023/0113708 A1 Apr. 13, 2023

Related U.S. Application Data
(60) Provisional application No. 63/262,712, filed on Oct. 19, 2021.

Foreign Application Priority Data
Oct. 12, 2021 (CN) .......................... 202111184699.8

(51) Int. Cl.
*B01J 21/04* (2006.01)
*B01D 53/86* (2006.01)
(Continued)

(52) U.S. Cl.
CPC .......... *B01J 23/8926* (2013.01); *B01D 53/86* (2013.01); *B01J 21/04* (2013.01); *B01J 21/066* (2013.01);
(Continued)

(58) Field of Classification Search
CPC . B01J 21/04; B01J 21/066; B01J 23/10; B01J 23/8906; B01J 23/89263;
(Continued)

(56) References Cited

U.S. PATENT DOCUMENTS 8,101,146 B2   1/2012   Fedeyko et al.
8,875,490 B2   11/2014  Geveci et al.
(Continued)

FOREIGN PATENT DOCUMENTS

CN   105822399 A   8/2016
CN   205532806 U   8/2016
(Continued)

*Primary Examiner* — Cam N. Nguyen
(74) *Attorney, Agent, or Firm* — Ni Yan (57) ABSTRACT

A three-way catalyst article, and its use in an exhaust system for compressed natural gas engines, is disclosed. The catalyst article for treating exhaust gas from compressed natural gas (CNG) engine comprising: a substrate comprising an inlet end, an outlet end with an axial length L; a first catalytic region beginning at the outlet end and extending for less than the axial length L, wherein the first catalytic region comprises a first zeolite; and a second catalytic region beginning at the inlet end, wherein the second catalytic region comprises a second platinum group metal (PGM) component, a second oxygen storage capacity (OSC) material, and a second inorganic oxide; wherein the second PGM component is selected from the group consisting of palladium, platinum, rhodium or a combination thereof.

23 Claims, 4 Drawing Sheets

(51) Int. Cl.
  *B01J 21/06* (2006.01)
  *B01J 23/10* (2006.01)
  *B01J 23/89* (2006.01)
  *B01J 35/00* (2024.01)
  *F01N 3/10* (2006.01)

(52) U.S. Cl.
  CPC ............ *B01J 23/10* (2013.01); *B01J 23/8906* (2013.01); *B01J 35/19* (2024.01); *F01N 3/101* (2013.01); *F01N 3/106* (2013.01); *B01D 2255/1021* (2013.01); *B01D 2255/20738* (2013.01); *B01D 2255/20761* (2013.01)

(58) Field of Classification Search
  CPC ...... B01J 35/0006; F01N 3/101; F01N 3/106; B01D 53/86
  See application file for complete search history.

(56) References Cited

U.S. PATENT DOCUMENTS

| | | | |
|---|---|---|---|
| 9,057,301 B2 | 6/2015 | Devarakonda et al. | |
| 9,149,768 B1 | 10/2015 | Devarakonda et al. | |
| 9,259,684 B2* | 2/2016 | Blakeman | B01J 29/763 |
| 9,707,542 B2* | 7/2017 | Bergeal | F01N 3/106 |
| 9,878,287 B2* | 1/2018 | Lu | B01D 53/9418 |
| 10,150,082 B2* | 12/2018 | Yoshikawa | B01J 37/08 |
| 10,252,217 B2* | 4/2019 | Zhang | B01J 37/038 |
| 10,328,388 B2* | 6/2019 | Dumbuya | B01J 37/0244 |
| 10,364,725 B2 | 7/2019 | Liu et al. | |
| 10,500,571 B2* | 12/2019 | Greenham | B01J 35/0006 |
| 10,669,910 B2* | 6/2020 | Chen | F01N 3/0842 |
| 10,744,459 B2* | 8/2020 | Hoke | B01J 23/44 |
| 10,792,648 B2* | 10/2020 | Mohanan | B01J 29/76 |
| 10,807,040 B2* | 10/2020 | Chen | B01J 23/22 |
| 10,857,521 B2* | 12/2020 | Sung | B01J 29/22 |
| 10,926,221 B2* | 2/2021 | Chen | B01D 53/9418 |
| 10,987,658 B2* | 4/2021 | Camm | B01D 53/945 |
| 11,000,838 B2* | 5/2021 | Greenham | B01J 29/40 |
| 11,110,447 B2* | 9/2021 | Dong | B01D 53/9468 |
| 11,154,815 B2* | 10/2021 | Voss | B01D 53/9477 |
| 11,207,642 B2* | 12/2021 | Goodwin | B01D 53/945 |
| 11,225,895 B2* | 1/2022 | Arulraj | F01N 3/035 |
| 11,260,372 B2* | 3/2022 | Xue | B01D 53/9472 |
| 11,285,467 B2* | 3/2022 | Clowes | B01D 53/86 |
| 11,364,485 B2* | 6/2022 | Qiao | B01J 23/464 |
| 11,439,987 B2* | 9/2022 | Ji | B01J 23/44 |
| 11,577,234 B2* | 2/2023 | Dong | B01D 53/9472 |
| 11,642,655 B2* | 5/2023 | Kadono | B01J 35/023 502/304 |
| 11,712,685 B2* | 8/2023 | Bidal | B01J 29/763 422/177 |
| 11,745,173 B2* | 9/2023 | Ji | B01J 35/04 502/303 |
| 11,759,770 B2* | 9/2023 | Collier | B01J 29/74 423/213.2 |
| 11,786,885 B2* | 10/2023 | DePuccio | B01J 27/053 502/262 |
| 11,788,450 B2* | 10/2023 | Millington | B01J 37/038 502/339 |
| 2006/0029534 A1 | 2/2006 | Eiteneer et al. | |
| 2015/0315944 A1 | 11/2015 | Devarakonda et al. | |
| 2016/0367975 A1* | 12/2016 | Lu | B01D 53/9418 |
| 2018/0015446 A1 | 1/2018 | Chen et al. | |
| 2018/0043305 A1 | 2/2018 | Voss et al. | |
| 2018/0065083 A1* | 3/2018 | Bidal | B01J 37/0236 |
| 2018/0065086 A1* | 3/2018 | Bidal | B01J 35/40 |
| 2019/0105636 A1* | 4/2019 | Wang | B01J 37/0201 |
| 2019/0240643 A1* | 8/2019 | Karpov | B01J 23/44 |
| 2021/0301698 A1* | 9/2021 | Armitage | B01J 37/12 |
| 2022/0088575 A1* | 3/2022 | Hayashi | B01J 23/63 |
| 2022/0099008 A1* | 3/2022 | Kadono | B01J 23/40 |
| 2022/0134314 A1* | 5/2022 | Howard | B01D 53/9472 422/122 |
| 2022/0136417 A1* | 5/2022 | Millington | B01J 37/038 502/339 |
| 2022/0347661 A1* | 11/2022 | Caudle | B01D 53/9422 |
| 2023/0035318 A1* | 2/2023 | Green | B01D 53/9436 |
| 2023/0070291 A1* | 3/2023 | Nagaoka | B01J 23/58 |
| 2023/0070493 A1* | 3/2023 | Millington | B01J 37/0215 |
| 2023/0143941 A1* | 5/2023 | Chandler | B01D 53/9436 423/213.5 |
| 2023/0338940 A1* | 10/2023 | Sung | F01N 3/2803 |
| 2023/0364588 A1* | 11/2023 | Strehlau | F01N 3/105 |
| 2024/0001343 A1* | 1/2024 | Qiao | B01J 23/02 |
| 2024/0109055 A1* | 4/2024 | Nagaoka | B01J 35/56 |

FOREIGN PATENT DOCUMENTS

| | | |
|---|---|---|
| CN | 109261200 A | 1/2019 |
| WO | 2016/130272 A1 | 8/2016 |
| WO | 2018/011552 A1 | 1/2018 |

* cited by examiner

ZONED CATALYSTS FOR CNG ENGINE EXHAUST GAS TREATMENTS WITH IMPROVED AMMONIA EMISSION CONTROL

FIELD OF THE INVENTION

The present invention relates to a catalyzed article useful in treating exhaust gas emissions from compressed natural gas (CNG) engines.

BACKGROUND OF THE INVENTION

CNG is composed of simple hydrocarbons, primarily methane, which leads to much lower $CO_2$ generation produced per unit of energy. And CNG has been used as a clean energy alternative to conventional gasoline and diesel fuels. CNG is also preferred in the market due to its abundant supply and relatively low price. Therefore, in recent years, CNG engines have attracted increased attention in auto market, especially for the heavy-duty vehicle which operates with a CNG engine under stoichiometric calibration. Even operating under CNG, automotive exhaust emission is inevitable, which usually includes typical pollutants like hydrocarbons (HCs), carbon monoxide (CO) and nitrogen oxides ("$NO_x$"). And traditional gasoline emission catalysts, such as three-way catalysts (TWC), are usually applied for the exhaust emission control from the CNG engine. However, ammonia ($NH_3$) has been recognized as a by-product when using TWC over a stoichiometric CNG engine to reduce $NO_x$. Thus, $NH_3$ brings new pollutant emission problems, such as secondary inorganic aerosols formation, which can lead to degradation of air quality. To better control $NH_3$ emission, China VI legislation on heavy-duty CNG engines has set $NH_3$ emission limit to as low as 10 ppm.

To meet China VI regulation and to get $NH_3$ emission under control, others have attempted to use an ammonia slip catalyst (ASC), which is a typical emission control approach in heavy duty diesel (HDD) aftertreatment system. However, due to different compositions in fuel sources (diesel vs. CNG) and different operating conditions (lean vs. stoichiometric), a typical ASC design does not quite work for $NH_3$ emission control over a stoichiometric CNG engine. Thus, there remains a need for an improved $NH_3$ emission control catalyst that is specifically designed to treat exhaust gas emission from a stoichiometric CNG engine.

SUMMARY OF THE INVENTION

One aspect of the present disclosure is directed to a catalyst article for treating exhaust gas from compressed natural gas (CNG) engine comprising: a substrate comprising an inlet end, an outlet end with an axial length L; a first catalytic region beginning at the outlet end and extending for less than the axial length L, wherein the first catalytic region comprises a first zeolite; and a second catalytic region beginning at the inlet end, wherein the second catalytic region comprises a second platinum group metal (PGM) component, a second oxygen storage capacity (OSC) material, and a second inorganic oxide; wherein the second PGM component is selected from the group consisting of palladium, platinum, rhodium or a combination thereof.

The invention also encompasses an exhaust system for the CNG engines that comprises the catalyst article of the invention.

The invention also encompasses treating an exhaust gas from a CNG engine, in particular for treating exhaust gas from a stoichiometric CNG engine. The method comprises contacting the exhaust gas with the catalyst article of the invention.

BRIEF DESCRIPTION OF THE DRAWINGS

FIG. 4 shows one embodiment according to the present invention, the first catalytic region extends less than 100% of the axial length L, from the outlet end; the third catalytic region extends less than 100% of the axial length L, from the inlet end. The total length of the first and the second catalytic region can be less than, equal to, or greater than the axial length L. The second catalytic region extends less than 100% of the axial length L, from the inlet end; the fourth catalytic region extends less than 100% of the axial length L, from the outlet end. The total length of the second and the fourth catalytic region can be less than, equal to, or greater than the axial length L. The second and fourth catalytic regions constitutes bottom layer; and the third and first catalytic regions constitutes top layer.

DETAILED DESCRIPTION OF THE INVENTION

The present invention is directed to catalytic treatment of combustion exhaust gas, such as that produced by stoichiometric CNG engines, and to related catalytic articles and systems. More specifically, the invention relates the suppression of ammonia emission and simultaneous treatment of $NO_x$, CO, HC in a vehicular exhaust system. The processes of the present invention also reduce processing time and lower costs of the catalyst.

One aspect of the present disclosure is directed to a catalyst article for treating exhaust gas from compressed natural gas (CNG) engine comprising: a substrate comprising an inlet end, an outlet end with an axial length L; a first catalytic region beginning at the outlet end and extending for less than the axial length L, wherein the first catalytic region comprises a first zeolite; and a second catalytic region beginning at the inlet end, wherein the second catalytic region comprises a second platinum group metal (PGM) component, a second oxygen storage capacity (OSC) material, and a second inorganic oxide; wherein the second PGM component is selected from the group consisting of palladium, platinum, rhodium or a combination thereof.

First Catalytic Region

The first zeolite can be a silica-containing zeolite such as a siliceous zeolite, and it also may be referred to an aluminosilicate zeolite, a metal-substituted aluminosilicate zeolite, an aluminophosphate (AlPO) zeolite, a metal-substituted (MeAlPO) zeolite, a silico-aluminophosphate (SAPO), or a metal-substituted silico-aluminophosphate (MeAPSO), or a modified zeolite by Zr, P. It is preferred that the zeolite is an aluminosilicate or silico-aluminophosphate (SAPO) zeolite. More preferably, the zeolite is aluminosilicate.

The zeolite may be microporous or microporous zeolite, and it is preferably the zeolite has a framework type selected from the group of consisting of ACO, AEI, AEN, AFN, AFT, AFX, ANA, APC, APD, AST, ASV, ATT, BCT, BEA, BEC, BOF, BOG, BRE, CAN, CDO, CFI, CGS, CHA, —CHI, CON, DAC, DDR, DFT, EAB, EDI, EPI, ERI, FER, GIS, GOD, IHW, ITE, ITW, LEV, KFI, MER, MFI, MON, NSI, OWE, PAU, PHI, RHO, RTH, SAT, SAV, SIV, THO, TSC, UEI, UFI, VNI, YUG, ZON. Each of the aforementioned three-letter codes represents a framework type in accordance with the "IUPAC Commission on zeolite Nomenclature" and/or the structure Commission of the international Zeolite Association. More preferably, the first zeolite has a framework type selected from AEI, BEA, CHA, FER, FAU, MFA. In some embodiments, the first zeolite can be AEI, BEA, FER, or CHA. In further embodiments, the first zeolite can be AEI or CHA. In yet further embodiment, the first zeolite can be AEI. In another further embodiment, the first zeolite can be CHA. In general, the first zeolite may have a silica-to-alumina ratio (SAR) of from 2 to 500, preferably from 4 to 250, and more preferably from 8-150. In some embodiments, the first zeolite is AEI or CHA with SAR range of 8-40, In further embodiments, the first zeolite is AEI or CHA with SAR range of 10-30.

In some embodiments, the first catalytic region can further comprise a first PGM component selected from the group consisting of Pd, Pt, Rh and a combination thereof. In further embodiments, the first PGM component can be Pt. In certain embodiments, the first PGM component loading can be 0.1-50 g/ft$^3$ or 0.1-25 g/ft$^3$ or 0.1-15 g/ft$^3$.

In other embodiments, the first catalytic region can further comprise a first transition metal may be selected from the group consisting of Fe, Cu, Co, Mn, Ni, Zn, Ce, Mo, Ag, and a combination of any two or more. In further embodiments, the first transition metal can be selected from Ce, Mn, Cu, Co, Ni or Fe, and a combination of any two or more. In yet other embodiments, the first transition metal can be Cu and/or Fe. In certain embodiments, the first transition metal is 0.01-20 wt. %; preferably, 0.1-15% wt. %; more preferably, 0.5-10% wt. %; based on the weight of the first zeolite.

In some embodiments, the first catalytic region can extend for 10-50%, 10-40%, or 10-30% of the axial length L. Alternatively, the first catalytic region can extend for 20-50% or 20-40% of the axial length L.

The total washcoat loading of the first catalytic region can be less than 3.5 g/in$^3$, preferably, less than 3.0 g/in$^3$ or 2.5 g/in$^3$. Alternatively, the total washcoat loading of the first catalytic region can be from 0.5 to 3.5 g/in$^3$; preferably, can be from 0.6 to 3 g/in$^3$ or 0.7 to 2.8 g/in$^3$.

Second Catalytic Region

In some embodiments, the second PGM component can be Pd and Rh. In other embodiments, the second PGM component can be Pt and Rh.

The second OSC material can be cerium oxide, zirconium oxide, a ceria-zirconia mixed oxide, an alumina-ceria-zirconia mixed oxide, or a combination thereof. More preferably, the second OSC material comprises the ceria-zirconia mixed oxide, the alumina-ceria-zirconia mixed oxide, or a combination thereof. In addition, the second OSC material may further comprise one or more of dopants like lanthanum, neodymium, praseodymium, yttrium etc. Moreover, the second OSC material may have the function as a support material for the second PGM component. In some embodiments, the second OSC material comprises the ceria-zirconia mixed oxide and the alumina-ceria-zirconia mixed oxide.

The ceria-zirconia mixed oxide can have a weight ratio of zirconia dioxide to ceria dioxide at least 50:50, preferably, higher than 60:40, more preferably, higher than 65:35. Alternatively, the ceria-zirconia mixed oxide also can have a weight ratio of ceria dioxide to zirconia dioxide less than 50:50, preferably, less than 40:60, more preferably, less than 35:65.

The second OSC material (e.g., ceria-zirconia mixed oxide) can be from 10 to 90 wt. %, preferably, 20-90 wt. %, more preferably, 30-90 wt. %, based on the total washcoat loading of the second catalytic region.

The second OSC material loading in the second catalytic region can be less than 2 $g/in^3$. In some embodiments, the second OSC material loading in the second catalytic region is no greater than 2 $g/in^3$, 1.5 $g/in^3$, 1.2 $g/in^3$, 1.0 $g/in^3$, or 0.8 $g/in^3$.

The second inorganic oxide is preferably an oxide of Groups 2, 3, 4, 5, 13 and 14 elements. The second inorganic oxide is preferably selected from the group consisting of alumina, zirconia, magnesia, silica, lanthanum, yttrium, neodymium, praseodymium oxides, and mixed oxides or composite oxides thereof. Particularly preferably, the second inorganic oxide is alumina, lanthanum-alumina, zirconia, or a magnesia/alumina composite oxide. One especially preferred second inorganic oxide is alumina or lanthanum-alumina.

The second OSC material and the second inorganic oxide can have a weight ratio of no greater than 10:1, preferably, no greater than 8:1, more preferably, no greater than 5:1, most preferably, no greater than 4:1.

Alternatively, the second OSC material and the second inorganic oxide can have a weight ratio of 10:1 to 1:10, preferably, 8:1 to 1:8; more preferably, 5:1 to 1:5; and most preferably, 4:1 to 1:4.

In some embodiments, the second catalytic region can further comprise a second alkali or alkaline earth metal.

The second alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the second catalytic region.

It is even more preferable that the second alkali or alkaline earth metal is strontium. The strontium, where present, is preferably present in an amount of 0.1 to 15 wt. %, and more preferably 3 to 10 wt. %, based on the total weight of the second catalytic region.

It is also preferable that the second alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the second catalytic region. It is more preferable that the second alkali or alkaline earth metal is composite oxide of barium and strontium.

Preferably the barium or strontium is present as $BaCO_3$ or $SrCO_3$. Such a material can be performed by any method known in the art, for example incipient wetness impregnation or spray-drying.

In some embodiments, the second catalytic region is substantially free of the second alkali or alkaline earth metal. In further embodiments, the second catalytic region is substantially free of, or does not comprise, the second alkali or alkaline earth metal.

In some embodiments, the second catalytic region can extend for 50 to 90%, 50 to 80%, or 50-70% of the axial length L. Alternatively, the second catalytic region can extend for 60 to 90 percent of the axial length L; preferably, 60 to 80 percent of the axial length L.

Alternatively, the second catalytic region can be no greater than 90%, 85%, 80%, or 75% of the axial length L.

In some embodiments, the second catalytic region can overlap with the first catalytic region. In further embodiments, the second catalytic region can overlap with the first catalytic region for 5 to 40 percent of the axial length L. Preferably, the total length of the second region and the first region is equal or greater than the axial length L. In certain embodiments, the total length of the first catalytic region and the second catalytic region equals to 100% L. In other embodiments, the total length of the first catalytic region and the second catalytic region is less than 100% L, for example, no greater than 99%, 95%, 85%, or 80% of the axial length L.

In some embodiments, the first catalytic region can be supported/deposited directly on the substrate. In certain embodiments, the second catalytic region can be supported/deposited directly on the substrate.

The total washcoat loading of the second catalytic region can be less than 3.5 $g/in^3$, preferably, less than 3.0 $g/in^3$ or 2.5 $g/in^3$. Alternatively, the total washcoat loading of the first catalytic region can be from 0.5 to 3.5 $g/in^3$; preferably, can be from 0.6 to 3 $g/in^3$ or 0.7 to 2.8 $g/in^3$.

Third Catalytic Region

The catalytic article may further comprise a third catalytic region. In some embodiments, the third catalytic region can begin at the inlet end and can extend for less than the axial length L.

The third catalytic region can further comprise a third PGM component, a third oxygen storage capacity (OSC) material, a third alkali or alkaline earth metal component, and/or a third inorganic oxide.

The third PGM component can be selected from the group consisting of platinum, palladium, rhodium, and a mixture thereof. In some embodiments, the third PGM component can be palladium, rhodium or a mixture thereof. In another embodiments, the third PGM component can be platinum, rhodium or a mixture thereof.

The third OSC material can be cerium oxide, zirconium oxide, a ceria-zirconia mixed oxide, an alumina-ceria-zirconia mixed oxide, or a combination thereof. More preferably, the third OSC material comprises the ceria-zirconia mixed oxide, the alumina-ceria-zirconia mixed oxide, or a combination thereof. In addition, the third OSC material may further comprise one or more of dopants like lanthanum, neodymium, praseodymium, yttrium etc. Moreover, the third OSC material may have the function as a support material for the third PGM component. In some embodiments, the third OSC material comprises the ceria-zirconia mixed oxide and the alumina-ceria-zirconia mixed oxide.

The ceria-zirconia mixed oxide can have a weight ratio of zirconia dioxide to ceria dioxide at least 50:50, preferably, higher than 60:40, more preferably, higher than 65:35. Alternatively, the ceria-zirconia mixed oxide also can have a weight ratio of ceria dioxide to zirconia dioxide less than 50:50, preferably, less than 40:60, more preferably, less than 35:65.

The third OSC material (e.g., ceria-zirconia mixed oxide) can be from 10 to 90 wt. %, preferably, 25-75 wt. %, more preferably, 30-60 wt. %, based on the total washcoat loading of the third catalytic region.

The third OSC material loading in the third catalytic region can be less than 2 g/in$^3$. In some embodiments, the third OSC material loading in the second catalytic region is no greater than 2.0 g/in$^3$, 1.5 g/in$^3$, 1.2 g/in$^3$, 1.0 g/in$^3$, or 0.8 g/in$^3$.

The total washcoat loading of the third catalytic region can be less than 3.5 g/in$^3$, preferably, no more than 3.0 g/in$^3$, 2.5 g/in$^3$, or 2 g/in$^3$.

The third alkali or alkaline earth metal is preferably barium, strontium, mixed oxides or composite oxides thereof. Preferably the barium or strontium, where present, is in an amount of 0.1 to 15 wt. %, and more preferably 3 to 10 wt. % of barium or strontium, based on the total weight of the third catalytic region.

It is even more preferable that the third alkali or alkaline earth metal is strontium. The strontium, where present, is preferably present in an amount of 0.1 to 15 wt. %, and more preferably 3 to 10 wt. %, based on the total weight of the third catalytic region.

It is also preferable that the third alkali or alkaline earth metal is mixed oxides or composite oxide of barium and strontium. Preferably, the mixed oxides or composite oxide of barium and strontium is present in an amount of 0.1 to 15 wt. %, and more preferably 3 to 10 wt. %, based on the total weight of the third catalytic region. It is more preferable that the third alkali or alkaline earth metal is composite oxide of barium and strontium.

Preferably the barium or strontium is present as BaCO$_3$ or SrCO$_3$ Such a material can be performed by any method known in the art, for example incipient wetness impregnation or spray-drying.

In some embodiments, the third catalytic region is substantially free of the third alkali or alkaline earth metal. In further embodiments, the third catalytic region is substantially free of, or does not comprise, the third alkali or alkaline earth metal.

The third inorganic oxide is preferably an oxide of Groups 2, 3, 4, 5, 13 and 14 elements. The third inorganic oxide is preferably selected from the group consisting of alumina, zirconia, magnesia, silica, lanthanum, neodymium, praseodymium, yttrium oxides, and mixed oxides or composite oxides thereof. Particularly preferably, the third inorganic oxide is alumina, lanthanum-alumina, zirconia, or a magnesia/alumina composite oxide. One especially preferred third inorganic oxide is alumina or lanthanum-alumina.

The third OSC material and the third inorganic oxide can have a weight ratio of no greater than 10:1, preferably, no greater than 8:1 or 5:1, more preferably, no greater than or 5:1, most preferably, no greater than 4:1.

Alternatively, the third OSC material and the third inorganic oxide can have a weight ratio of 10:1 to 1:10, preferably, 8:1 to 1:8 or; more preferably, 5:1 to 1:5 or; and most preferably, 4:1 to 1:4.

Figure 3A:
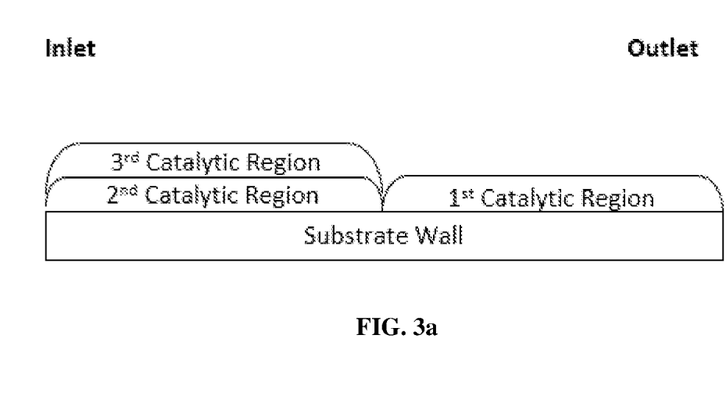
FIG. 3a shows one embodiment according to the present invention, the first catalytic region extends less than 100% of the axial length L, from the outlet end; the second catalytic region extends less than 100% of the axial length L, from the inlet end. The total length of the second and the first catalytic region is equal to the axial length L. The $3^{rd}$ catalytic region extends less than 100% of the axial length L, from the inlet end.
Figure 3B:
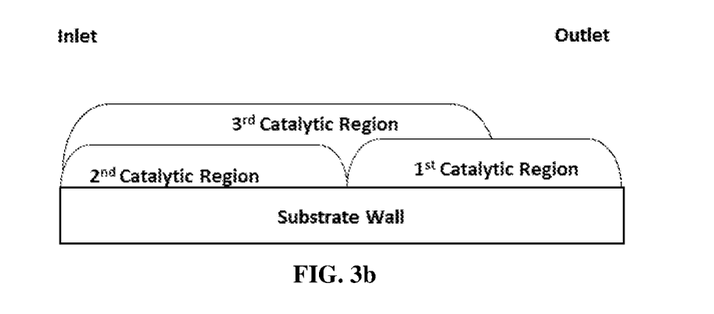
FIG. 3b shows one embodiment according to the present invention, the first catalytic region extends less than 100% of the axial length L, from the outlet end; the second catalytic region extends less than 100% of the axial length L, from the inlet end. The total length of the second and the first catalytic region is equal to the axial length L. The $3^{rd}$ catalytic region extends less than 100% of the axial length L, from the inlet end and partially covers first catalytic region.
Figure 3C:
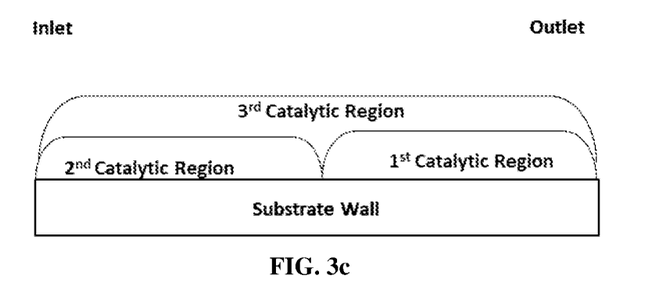
FIG. 3c shows one embodiment according to the present invention, the first catalytic region extends less than 100% of the axial length L, from the outlet end; the second catalytic region extends for less than 100% of the axial length L, form the inlet end. The total length of the second and the first catalytic region is equal or less than the axial length L. The 3$^{rd}$ catalytic region extends 100% of the axial length L and overlies the first and second catalytic regions as top layer.
Figure 3D:
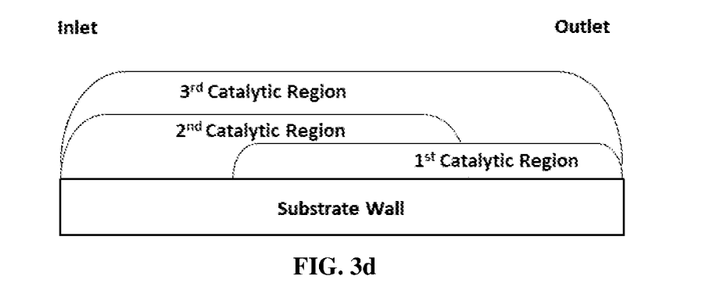
FIG. 3d shows one embodiment according to the present invention, the first catalytic region extends less than 100% of the axial length L, from the outlet end; the second catalytic region extends for less than 100% of the axial length L, form the inlet end. The total length of the second and the first catalytic region is greater than the axial length L. The third catalytic region extends 100% of the axial length L.
Figure 3E:
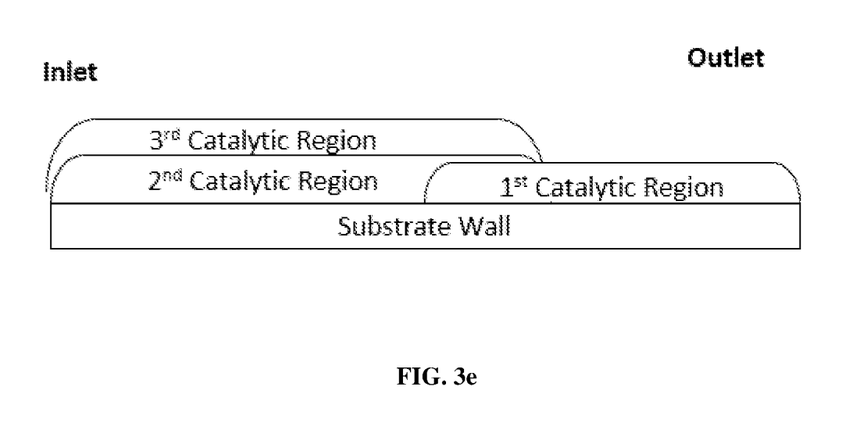
FIG. 3e shows one embodiment according to the present invention, the first catalytic region extends less than 100% of the axial length L, from the outlet end; the second catalytic region extends for less than 100% of the axial length L, form the inlet end. The total length of the second and the first catalytic region is greater than the axial length L. The 3$^{rd}$ catalytic region extends less than 100% of the axial length L, from the inlet end.
Figure 4:
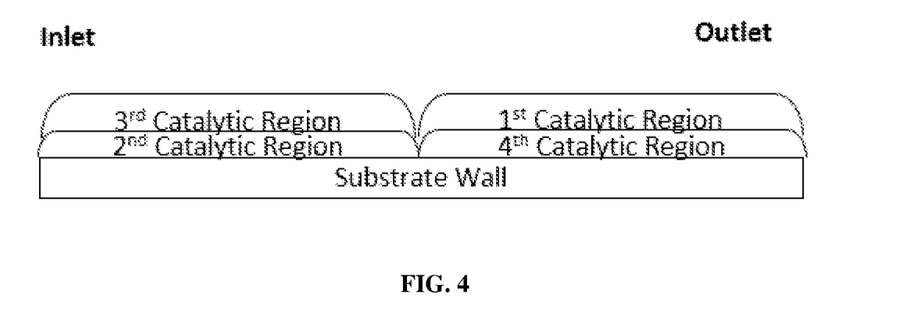

The third catalytic region can extend for 100 percent of the axial length L (e.g., see FIGS. 3c and 3d). Alternatively, the third catalytic region can be less than the axial length L, for example, no greater than 95%, 90%, 80%, or 70% of the axial length L (e.g., see FIGS. 3a, 3b, 3e, and 4). In some embodiments, the third catalytic region can begin at the outlet end.

Fourth Catalytic Region

The catalytic article may further comprise a fourth catalytic region. In some embodiments, the fourth catalytic region can begin at the outlet end and can extend for less than the axial length L.

The fourth catalytic region can further comprise a fourth PGM component and a fourth inorganic oxide.

The fourth PGM component can be selected from the group consisting of platinum, palladium, rhodium, and a mixture thereof. In some embodiments, the fourth PGM component can be platinum. In further embodiments, the fourth catalytic region is substantially free of other PGM component than Pt.

The fourth inorganic oxide is preferably an oxide of Groups 2, 3, 4, 5, 13 and 14 elements. The fourth inorganic oxide is preferably selected from the group consisting of alumina, zirconia, magnesia, silica, lanthanum, neodymium, praseodymium, yttrium oxides, and mixed oxides or composite oxides thereof. Particularly preferably, the fourth inorganic oxide is alumina, lanthanum-alumina, zirconia, or a magnesia/alumina composite oxide. One especially preferred fourth inorganic oxide is alumina or lanthanum-alumina.

The fourth catalytic region can be less than the axial length L, for example, no greater than 95%, 90%, 80%, or 70% of the axial length L.

In some embodiments, the fourth catalytic region can extend for 10-50%, 10-40%, or 10 to 30% of the axial length L. Alternatively, the fourth catalytic region can extend for 20-50% or 20-40% of the axial length L (e.g., see FIG. 4).

The catalyst article of the invention may comprise further components that are known to the skilled person. For example, the compositions of the invention may further comprise at least one binder and/or at least one surfactant. Where a binder is present, dispersible alumina binders are preferred.

Substrate

Preferably the substrate is a flow-through monolith.

The substrate can be less than 8 inches in length, preferably from 4 to 7 inches.

The flow-through monolith substrate has a first face and a second face defining a longitudinal direction there between. The flow-through monolith substrate has a plurality of channels extending between the first face and the second face. The plurality of channels extends in the longitudinal direction and provide a plurality of inner surfaces (e.g., the surfaces of the walls defining each channel). Each of the plurality of channels has an opening at the first face and an opening at the second face. For the avoidance of doubt, the flow-through monolith substrate is not a wall flow filter.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the monolith substrate has from 300 to 900 channels per square inch, preferably from 400 to 800. For example, on the first face, the density of open first channels and closed second channels is from 600 to 700 channels per square inch. The channels can have cross sections that are rectangular, square, circular, oval, triangular, hexagonal, or other polygonal shapes.

The monolith substrate acts as a support for holding catalytic material. Suitable materials for forming the monolith substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates are well known in the art.

It should be noted that the flow-through monolith substrate described herein is a single component (i.e., a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the catalyst article of the present comprises a ceramic substrate, the ceramic substrate may be made of any suitable refractory material, e.g., alumina, silica, ceria, zirconia, magnesia, zeolites, silicon nitride, silicon carbide, zirconium silicates, magnesium silicates, aluminosilicates and metalloid aluminosilicates (such as cordierite and spodumene), or a mixture or mixed oxide of any two or more thereof. Cordierite, a magnesium aluminosilicate, and silicon carbide are particularly preferred.

In embodiments wherein the catalyst article of the present invention comprises a metallic substrate, the metallic substrate may be made of any suitable metal, and in particular heat-resistant metals and metal alloys such as titanium and stainless steel as well as ferritic alloys containing iron, nickel, chromium, and/or aluminum in addition to other trace metals.

In some embodiments, the first catalytic region can be located on a different substrate than the second (or optionally the third) catalytic region. In certain embodiments, the first catalytic region and the fourth catalytic region can be on the same substrate, but located on a different substrate than the second (or optionally the third) catalytic region.

Another aspect of the present disclosure is directed to a method for treating a vehicular exhaust gas from stoichiometric CNG engine containing $NO_x$, CO, HC (methane), and ammonia using the catalyst article described herein. The testing catalysts made according to this invention showed significantly improved $NH_3$ control performance compared to with conventional TWC (with the same or similar PGM loading), also showed improved performance in ammonia emission control under wide lambda range (e.g., see Example 1; and Tables 1-2).

Another aspect of the present disclosure is directed to a system for treating vehicular exhaust gas comprising the catalyst article described herein in conjunction with a conduit for transferring the exhaust gas through the system. In some embodiments, the system does not comprise an ammonia slip catalyst (ASC).

Definitions

The term "region" as used herein refers to an area on a substrate, typically obtained by drying and/or calcining a washcoat. A "region" can, for example, be disposed or supported on a substrate as a "layer" or a "zone". The area or arrangement on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
 (a) nearer to an inlet end (e.g. open end) of an inlet channel of the substrate than the zone is to a closed end (e.g. blocked or plugged end) of the inlet channel, and/or
 (b) nearer to a closed end (e.g. blocked or plugged end) of an outlet channel of the substrate than the zone is to an outlet end (e.g. open end) of the outlet channel. Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
 (a) nearer to an outlet end (e.g. an open end) of an outlet channel of the substrate than the zone is to a closed end (e.g. blocked or plugged) of the outlet channel, and/or
 (b) nearer to a closed end (e.g. blocked or plugged end) of an inlet channel of the substrate than it is to an inlet end (e.g. an open end) of the inlet channel.
Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials or steps, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise."

The expression "essentially free of" as used herein with reference to a material, typically in the context of the content of a region, a layer or a zone, means that the material in a trace amount, such as ≤1% by weight, preferably ≤0.5% by weight, more preferably ≤0.1% by weight. The expression "essentially free of" embraces the expression "does not comprise."

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

The following examples merely illustrate the invention. Those skilled in the art will recognize many variations that are within the spirit of the invention and scope of the claims.

EXAMPLES

Materials

All materials are commercially available and were obtained from the known suppliers, unless noted otherwise.

TWC-1

Figure 1:
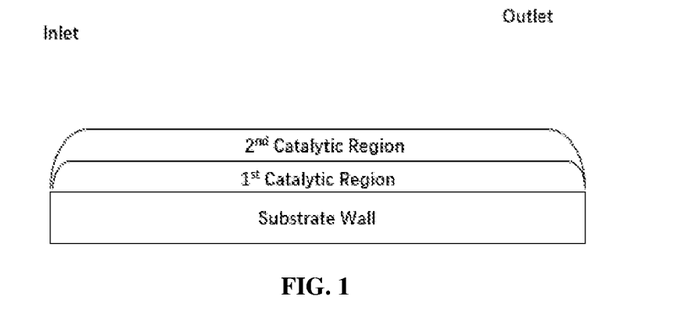
FIG. 1 shows configuration of TWC-1, TWC-2, TWC-3, and TWC-4 in the Examples, where the first catalytic region extends 100% of the axial length L, as bottom layer; the second catalytic region extends 100% of the axial length L, as top layer.
Figure 2A:
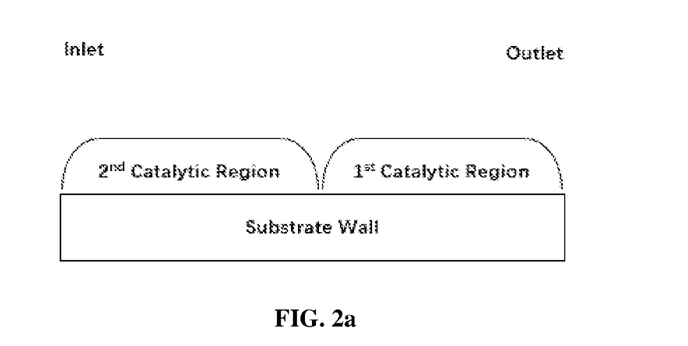
FIG. 2a shows one embodiment according to the present invention, the first catalytic region extends less than 100% of the axial length L, from the outlet end; the second catalytic region extends less than 100% of the axial length L, from the inlet end. The total length of the second and the first catalytic region is equal to the axial length L.
Figure 2B:
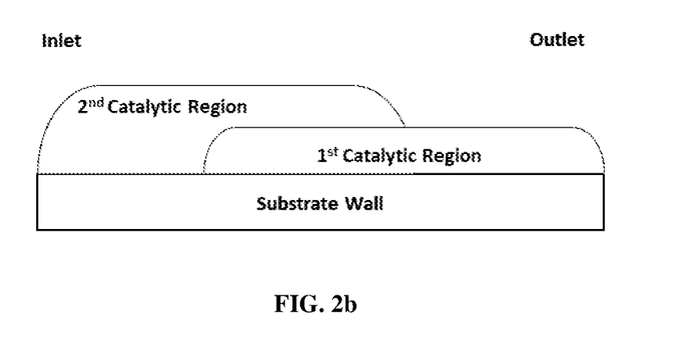
FIG. 2b shows one embodiment according to the present invention, the first catalytic region extends less than 100% of the axial length L, from the outlet end; the second catalytic region extends 100% of the axial length L, from the inlet end. The total length of the second and the first catalytic region is greater than the axial length L.
Figure 2C:
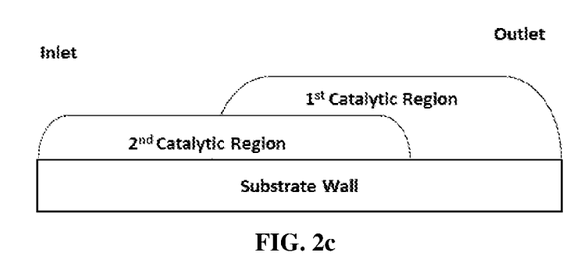
FIG. 2c shows one embodiment according to the present invention, the first catalytic region extends less than 100% of the axial length L, from the outlet end; the second catalytic region extends 100% of the axial length L, from the inlet end. The total length of the second and the first catalytic region is greater than the axial length L.
Figure 2D:
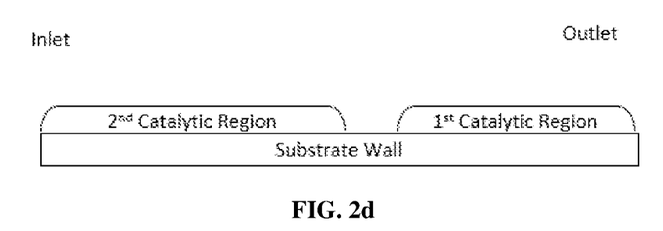
FIG. 2d shows one embodiment according to the present invention, the first catalytic region extends less than 100% of the axial length L, from the outlet end; the second catalytic region extends less than 100% of the axial length L, from the inlet end. The total length of the second and the first catalytic region is less than the axial length L.
Figure 2E:
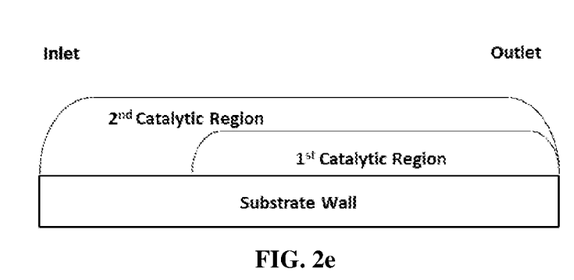
FIG. 2e shows one embodiment according to the present invention, the first catalytic region extends less than 100% of the axial length L, from the outlet end; the second catalytic region extends 100% of the axial length L, from the inlet end. The total length of the second and the first catalytic region is greater than the axial length L and the second catalytic region covers the first catalytic region.

TWC-1 is a typical three-way (Pt-Pd-Ph) catalyst with a double-layered structure in two catalytic regions as shown in FIG. 1. Bottom layer consists of Pt and Pd supported on a washcoat of a first CeZr mixed oxide, La-stabilized alumina, Sr promotor. The washcoat loading of the bottom layer was about 2.0 $g/in^3$ with Pt loading of 30 $g/ft^3$ and Pd loading of 60 $g/ft^3$. The washcoat was coated from each end face of a ceramic substrate (400 cpsi, 4.3 mil wall thickness) using standard coating procedures with coating depth targeted of 50% of the substrate length, dried at 100° C. and calcined at 500° C. for 45 mins.

Top layer consists of Rh supported on a washcoat of a second CeZr mixed oxide, La-stabilized alumina. The washcoat loading of the second layer was about 1.3 $g/in^3$ with a Rh loading of 10 $g/ft^3$. This second washcoat was then coated from each end face of the ceramic substrate containing the bottom layer from above, using standard coating procedures with coating depth targeted of 50% of the substrate length, dried at 100° C. and calcined at 500° C. for 45 mins.

TWC-2

TWC-2 is a typical three-way (Pt-Pd-Ph) catalyst with a double-layered structure in two catalytic regions as shown in FIG. 1. Bottom layer consists of Pt and Pd supported on a washcoat of a first CeZr mixed oxide, La-stabilized alumina, Sr promotor. The washcoat loading of the bottom layer was about 2.0 $g/in^3$ with Pt loading of 18 $g/ft^3$ and Pd loading of 36 $g/ft^3$. The washcoat was coated from each end face of a ceramic substrate (400 cpsi, 4.3 mil wall thickness) using standard coating procedures with coating depth targeted of 50% of the substrate length, dried at 100° C. and calcined at 500° C. for 45 mins.

Top layer consists of Rh supported on a washcoat of a second CeZr mixed oxide, La-stabilized alumina. The washcoat loading of the second layer was about 1.3 $g/in^3$ with a Rh loading of 6 $g/ft^3$. This second washcoat was then coated from each end face of the ceramic substrate containing the bottom layer from above, using standard coating procedures with coating depth targeted of 50% of the substrate length, dried at 100° C. and calcined at 500° C. for 45 mins.

TWC-3

TWC-3 is a typical three-way (Pt-Pd-Ph) catalyst with a double-layered structure in two catalytic regions as shown in FIG. 1. Bottom layer consists of Pt and Pd supported on a washcoat of a first CeZr mixed oxide, La-stabilized alumina, Ba promotor. The washcoat loading of the bottom layer was about 2.2 $g/in^3$ with Pt loading of 5 $g/ft^3$ and Pd loading of 47 $g/ft^3$. The washcoat was coated from each end face of a ceramic substrate (400 cpsi, 4.3 mil wall thickness) using standard coating procedures with coating depth targeted of 50% of the substrate length, dried at 100° C. and calcined at 500° C. for 45 mins.

Top layer consists of Pt and Rh supported on a washcoat of a second CeZr mixed oxide, La-stabilized alumina. The washcoat loading of the second layer was about 1.3 $g/in^3$ with Pt loading of 4 $g/ft^3$ and Rh loading of 10 $g/ft^3$. This second washcoat was then coated from each end face of the ceramic substrate containing the bottom layer from above, using standard coating procedures with coating depth targeted of 50% of the substrate length, dried at 100° C. and calcined at 500° C. for 45 mins.

TWC-4

TWC-4 is a typical three-way (Pt-Pd-Ph) catalyst with a double-layered structure in two catalytic regions as shown in FIG. 1. Bottom layer consists of Pd supported on a washcoat of a first CeZr mixed oxide, La-stabilized alumina, Ba promotor. The washcoat loading of the bottom layer was about 2.2 $g/in^3$ with Pd loading of 24 $g/ft^3$. The washcoat was coated from each end face of a ceramic substrate (400 cpsi, 4.3 mil wall thickness) using standard coating procedures with coating depth targeted of 50% of the substrate length, dried at 100° C. and calcined at 500° C. for 45 mins.

Top layer consists of Pt and Rh supported on a washcoat of a second CeZr mixed oxide, La-stabilized alumina. The washcoat loading of the second layer was about 1.3 $g/in^3$ with Pt loading of 4.5 $g/ft^3$ and Rh loading of 9 $g/ft^3$. This second washcoat was then coated from each end face of the ceramic substrate containing the bottom layer from above, using standard coating procedures with coating depth targeted of 50% of the substrate length, dried at 100° C. and calcined at 500° C. for 45 mins.

Comparative Catalyst Article 1

A catalyst with three catalytic regions were prepared. (E.g., see FIG. 3a).

First Catalytic Region

The first catalytic region consists of Pt, which supported on a washcoat Si stabilized alumina and alumina sol as binder, the total washcoat loading was about 2.1 $g/in^3$, with Pt loading of 5 g/ft³. This catalytic region is same as a typical NH₃ oxidation catalyst coating applied in heavy duty diesel applications.

The washcoat of first catalytic region was coated from the outlet end face of a ceramic substrate (400 cpsi, 4.3 mil wall thickness) using standard coating procedures with coating depth targeted of 33% of the substrate length.

Second Catalytic Region

The washcoat of the second catalytic region was the same as TWC-2 bottom layer (about 2.0 g/in³ with Pt loading of 18 g/ft³ and Pd loading of 36 g/ft³). The washcoat was coated from the inlet end face of the ceramic substrate containing the first catalytic region from above, using standard coating procedures with coating depth targeted of 67% of the substrate length.

Third Catalytic Region

The washcoat of the third catalytic region was the same as TWC-2 top layer (about 1.3 g/in³ with a Rh loading of 6 g/ft³) and the washcoat of third catalytic region was also coated from the inlet end face of the ceramic substrate containing the first and the second catalytic regions from above, using standard coating procedures with coating depth targeted of 67% of the substrate length. The catalyst article was dried at 100° C. and calcined at 500° C. for 45 mins.

Catalyst Article 2

A catalyst with three catalytic regions were prepared. (E.g., see FIG. 3a).

First Catalytic Region

The first catalytic region consists of Cu, which supported on a CHA type of zeolite with SAR range~20-24 and binder, the total washcoat loading of this catalytic region was about 2.0 g/in³ with Cu loading of 3.3 wt. % (based on the weight of CHA).

The washcoat of first catalytic region was coated from the outlet end face of a ceramic substrate (400 cpsi, 4.3 mil wall thickness) using standard coating procedures with coating depth targeted of 43% of the substrate length.

Second Catalytic Region

The washcoat of the second catalytic region was the same as TWC-4 bottom layer (about 2.2 g/in³ with Pd loading of 24 g/ft³). The washcoat of the second catalytic region was coated from the inlet end face of the ceramic substrate containing the first catalytic region from above, using standard coating procedures with coating depth targeted of 57% of the substrate length.

Third Catalytic Region

The washcoat of the third catalytic region was the same as TWC-4 top layer (about 1.3 g/in³ with Pt loading of 4.5 g/ft³ and Rh loading of 9 g/ft³) and the washcoat of third catalytic region was also coated from the inlet end face of the ceramic substrate containing the first and the second catalytic region from above, using standard coating procedures with coating depth targeted of 57% of the substrate length. The catalyst was dried at 100° C. and calcined at 500° C. for 45 mins.

Catalyst Article 3

A catalyst with four catalytic regions were prepared. (E.g., see FIG. 4)

First Catalytic Region

The first catalytic region consists of Cu, which supported on a CHA type of zeolite with SAR range~20-24, and binder. The total washcoat loading of this catalytic region was about 2.4 g/in³ with Cu loading of 3.3%.

Second Catalytic Region

The washcoat of the second catalytic region was the same as TWC-4 bottom layer (about 2.2 g/in³ with Pd loading of 24 g/ft³).

Third Catalytic Region

The washcoat of the third catalytic region was the same as TWC-4 top layer (about 1.3 g/in³ with Pt loading of 4.5 g/ft³ and Rh loading of 9 g/ft³).

Fourth Catalytic Region

The fourth catalytic region consists of Pt which supported on the washcoat of alumina and binder. The total washcoat loading of this catalytic region was about 1.0 g/in³ with Pt loading of 3 g/ft³.

Coating Sequence and Depths

The washcoat of the fourth catalytic region was coated from the outlet end face of a ceramic substrate (400 cpsi, 4.3 mil wall thickness) using standard coating procedures with coating depth targeted of 43% of the substrate length. The washcoat of the first catalytic region was coated from the outlet end face of the ceramic substrate (400 cpsi, 4.3 mil wall thickness) containing the fourth catalytic region, using standard coating procedures with coating depth targeted of 43% of the substrate length.

The washcoat of the second catalytic region was coated from the inlet end face of the ceramic substrate containing the first and fourth catalytic regions from above, using standard coating procedures with coating depth targeted of 57% of the substrate length and the washcoat of third catalytic region was also coated from the inlet end face of the ceramic substrate containing the first, second, and fourth catalytic regions from above, using standard coating procedures with coating depth targeted of 57% of the substrate length. The catalyst article was dried at 100° C. and calcined at 500° C. for 45 mins.

Catalyst Article 4

The catalyst with three catalytic regions were prepared. (E.g., see FIG. 3a).

First Catalytic Region

The first catalytic region consists of Pt, which supported on an AEI type of zeolite with SAR range~17-22, and binder. The total washcoat loading of this catalytic region was about 2.5 g/in³ with Pt loading of 5 g/ft³. The washcoat of first catalytic region was coated from the outlet end face of a ceramic substrate (400 cpsi, 4.3 mil wall thickness) using standard coating procedures with coating depth targeted of 33% of the substrate length.

Second Catalytic Region

The washcoat of the second catalytic region was the same as TWC-4 bottom layer (about 2.2 g/in³ with Pd loading of 24 g/ft³). The washcoat of the second catalytic region was coated from the inlet end face of the ceramic substrate containing the first catalytic region from above, using standard coating procedures with coating depth targeted of 67% of the substrate length.

Third Catalytic Region

The washcoat of the third catalytic region was the same as TWC-4 top layer (about 1.3 g/in³ with Pt loading of 4.5 g/ft³ and Rh loading of 9 g/ft³) and the washcoat of third catalytic region was also coated from the inlet end face of the ceramic substrate containing the first and the second catalytic region from above, using standard coating procedures with coating depth targeted of 67% of the substrate length. The catalyst was dried at 100° C. and calcined at 500° C. for 45 mins.

Example 1—Improved Catalyst Performance

The following Systems were tested for their catalytic performances with the layout of TWC-1 or TWC-3 at upstream, and TWC-2 or TWC-4 at downstream:

Comparative System 1: TWC-1+TWC-2

Comparative System 2: TWC-1+Comparative Catalyst Article 1

Comparative System 3: TWC-3+TWC-4
System 4: TWC-3+Catalyst Article 2
System 5: TWC-3+Catalyst Article 3
System 6: TWC-3+Catalyst Article 4

Catalyst performance testing was carried out by natural gas engine under world harmonized transient cycle (WHTC). The WHTC test was considered as a reliable way of emission evaluation for engine operation. Cold and hot state WHTC test was conducted for each catalyst and emissions were measured post-catalyst. The final WHTC emission value is the sum of cold state and hot state WHTC, which account for 14% and 86% respectively.

The emission results on natural gas engine under WHTC cycle toward Comparative System 1 and Comparative System 2 were shown in Table 1. The results exhibited that $NH_3$ emission of Comparative Catalyst Article 1 and TWC-2 were comparative (32 ppm), and both failed to meet the China VI legislation requirement (10 ppm). Therefore, Comparative Catalyst Article 1, a typical $NH_3$ oxidation catalyst in HDD application, does not work for $NH_3$ emission control in Stoichiometric CNG application.

TABLE 1

Emission results on natural gas engine under WHTC cycle

| | | Emissions on natural gas engine | | | |
|---|---|---|---|---|---|
| | Catalyst Article | (mg/kwh) | | | (ppm) |
| System | Arrangement | CO | $CH_4$ | $NO_x$ | $NH_3$ |
| Comparative System 1 | TWC-1 + TWC-2 | 2130 | 190 | 43 | 32 |
| Comparative System 2 | TWC-1 + Comparative Catalyst Article 1 | 2030 | 187 | 36 | 32 |
| | China VI legislation limit | 4000 | 500 | 460 | 10 |

The emissions of Comparative System 3 and Systems 4-6 were illustrated in Table 2. As shown in Table 2, $NH_3$ emission from Comparative System 3 also exceeded the 10 ppm limit under China VI heavy-duty vehicle legislation. When TWC-4 was replaced by any one of Catalyst Articles 2-4, $NH_3$ emission decreased significantly by around 80% reduction and all the pollutants emission met the China VI legislation limits.

TABLE 2

Emission results on natural gas engine under WHTC cycle

| | | Emissions on natural gas engine | | | |
|---|---|---|---|---|---|
| | Catalyst Article | (mg/kwh) | | | (ppm) |
| System | Arrangement | CO | $CH_4$ | $NO_x$ | $NH_3$ |
| Comparative System 3 | TWC-3 + TWC-4 | 1270 | 215 | 110 | 17 |
| System 4 | TWC-3 + Catalyst Article 2 | 1280 | 203 | 151 | 3 |
| System 5 | TWC-3 + Catalyst Article 3 | 1550 | 211 | 109 | 4 |
| System 6 | TWC-3 + Catalyst Article 4 | 1400 | 210 | 220 | 3 |
| | China VI legislation limit | 4000 | 500 | 460 | 10 |

We claim:

1. A catalyst article for treating exhaust gas from compressed natural gas (CNG) engine comprising:
    a substrate comprising an inlet end, an outlet end with an axial length L;
    a first catalytic region beginning at the outlet end and extending for less than the axial length L, wherein the first catalytic region comprises a first zeolite; and
    a second catalytic region beginning at the inlet end, wherein the second catalytic region comprises a second platinum group metal (PGM) component, a second oxygen storage capacity (OSC) material, and a second inorganic oxide;
    wherein the second PGM component is selected from the group consisting of palladium, platinum, rhodium or a combination thereof; and
    wherein the second OSC material comprises cerium oxide, a ceria-zirconia mixed oxide, an alumina-ceria-zirconia mixed oxide, or a combination thereof.

2. The catalyst article of claim 1, wherein the first catalytic region extends for 10 to 50 percent of the axial length L.

3. The catalyst article of claim 1, wherein the second catalytic region extends for 50 to 90 percent of the axial length L.

4. The catalyst article of claim 1, wherein the second catalytic region overlaps with the first catalytic region.

5. The catalyst article of claim 4, wherein the second catalytic region overlaps with the first catalytic region for 5 to 40 percent of the axial length L.

6. The catalyst article of claim 1, wherein the second catalytic region does not overlap with the first catalytic region.

7. The catalyst article of claim 1, wherein the first catalytic region further comprises a first PGM component selected from the group consisting of Pd, Pt, and Rh.

8. The catalyst article of claim 7, wherein the first PGM component is Pt.

9. The catalyst article of claim 1, wherein the first catalytic region further comprises a first transition metal selected from the group consisting of Fe, Cu, Mn, Co, Ni, Zn and a combination thereof.

10. The catalyst article of claim 9, wherein the first transition metal is Cu and/or Fe.

11. The catalyst article of claim 10, wherein Cu is 0.01-20 wt. %, based on the weight of the first zeolite.

12. The catalyst article of claim 1, wherein the second OSC material comprises the ceria-zirconia mixed oxide, the alumina-ceria-zirconia mixed oxide, or a combination thereof.

13. The catalyst article of claim 1, wherein the second inorganic oxide is selected from the group consisting of alumina, zirconia, magnesia, silica, lanthanum, yttrium, neodymium, praseodymium oxides, and mixed oxides or composite oxides thereof.

14. The catalyst article of claim 1, further comprising a third catalytic region.

15. The catalyst article of claim 14, wherein the third catalytic region begins at the inlet end and extends for less than the axial length L.

16. The catalyst article of claim 14, wherein the third catalytic region comprises a third PGM component, a third oxygen storage capacity (OSC) material, a third alkali or alkaline-earth metal component, and/or a third inorganic oxide.

17. The catalyst article of claim 14, further comprising a fourth catalytic region.

18. The catalyst article of claim 17, wherein the fourth catalytic region begins at the outlet end and extends for less than the axial length L.

19. The catalyst article of claim 17, wherein the fourth catalytic region comprises a fourth PGM component and a fourth inorganic oxide.

20. The catalyst article of claim 1, wherein the substrate is a flow-through monolith or a wall flow filter.

21. An emission treatment system for treating a flow of a CNG engine exhaust gas comprising the catalyst article of claim 1.

22. The emission treatment system of claim 21, further comprising a TWC article, which is upstream of the catalyst article.

23. A method of treating an exhaust gas from a CNG engine comprising contacting the exhaust gas with the catalyst article of claim 1.

* * * * *